United States Patent [19]

Bopp et al.

[11] 4,271,718
[45] Jun. 9, 1981

[54] CABLE TENSION ADJUSTING MEANS FOR A BRAKE CABLE OPERATING LEVER

[75] Inventors: Robert D. Bopp; David P. Klosterman; Eugene C. Lipshield, all of Moberly, Mo.

[73] Assignee: Orscheln Co., Moberly, Mo.

[21] Appl. No.: 13,825

[22] Filed: Feb. 26, 1979

[51] Int. Cl.³ .......................... G05G 1/04; F16C 1/10
[52] U.S. Cl. .................................. 74/522; 74/501 R; 74/518; 74/531; 188/196 M
[58] Field of Search ...................... 74/517, 518, 501 R, 74/520, 522, 523, 531; 188/196 M

[56] References Cited

U.S. PATENT DOCUMENTS

| 2,126,652 | 8/1938 | Mueller | 74/522 |
| 2,171,403 | 8/1939 | Orscheln | 188/196 M |
| 2,464,096 | 3/1949 | Orscheln | 74/518 |
| 2,464,097 | 3/1949 | Orscheln | 74/518 |
| 3,379,074 | 4/1968 | Hirst, Jr. | 74/518 |
| 4,127,042 | 11/1978 | Lipshield | 74/520 |

FOREIGN PATENT DOCUMENTS 589293  2/1925  France ........................ 74/501

*Primary Examiner*—Kenneth Dorner
*Attorney, Agent, or Firm*—Laubscher & Laubscher

[57] ABSTRACT

A brake cable operating lever is disclosed including a device for adjusting the cable tension which is produced when the operating lever is in the brake-on position, characterized in that the rotary tension adjusting screw (36) which extends axially of the operating lever includes intermediate its ends an annular collar portion (36a) that is rotatably supported by an abutment shoulder (20f) on the operating lever (20), whereby the apparatus remains operable even if the manual operating knob (38) were to be removed from the screw member. An internal friction producing device (40) is provided for restricting rotation of the screw member about its axis.

13 Claims, 10 Drawing Figures

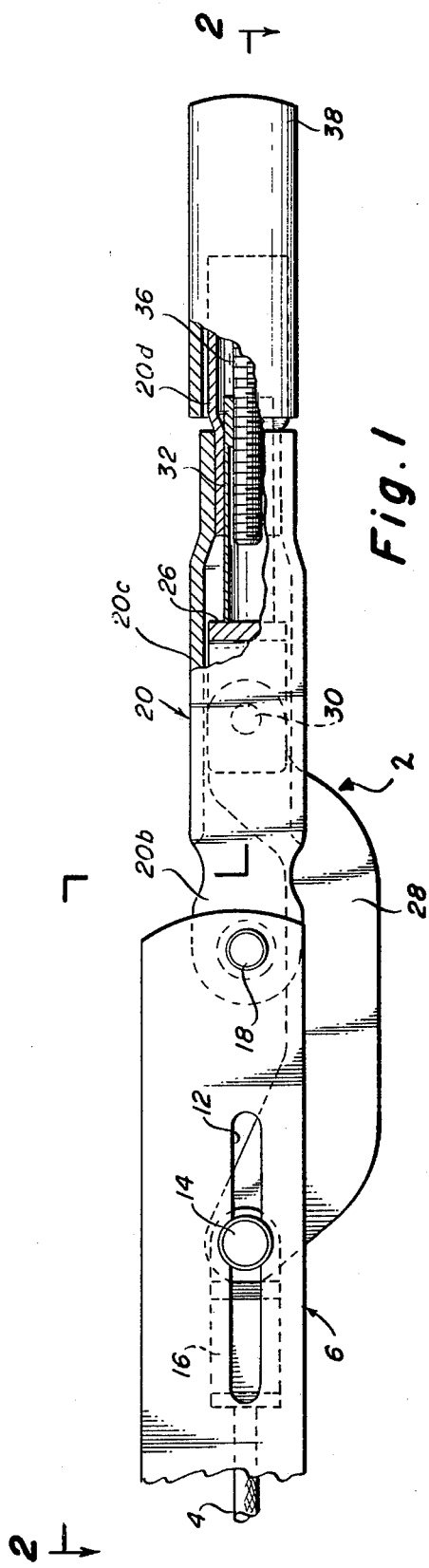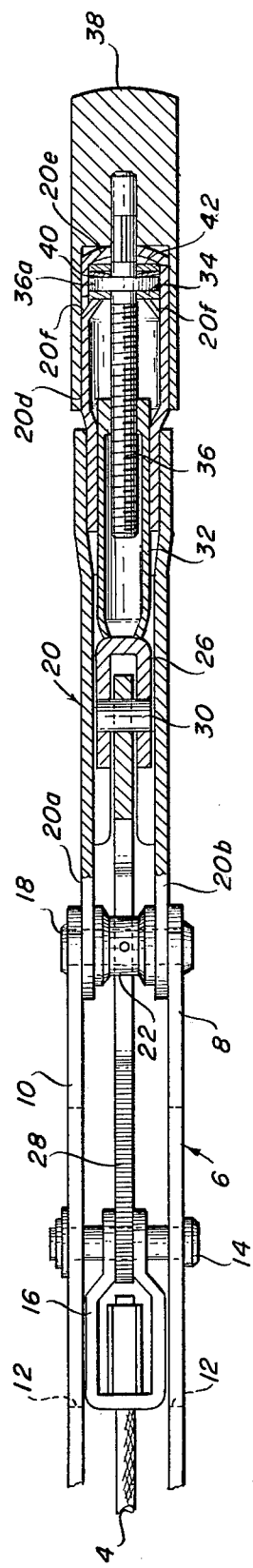

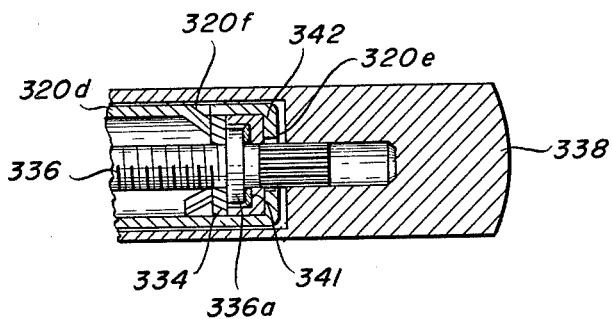
Fig. 7
Fig. 8
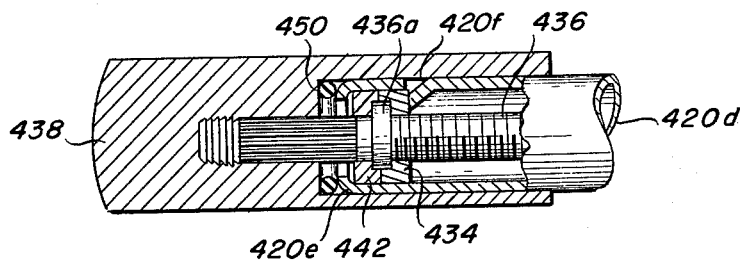
Fig. 9
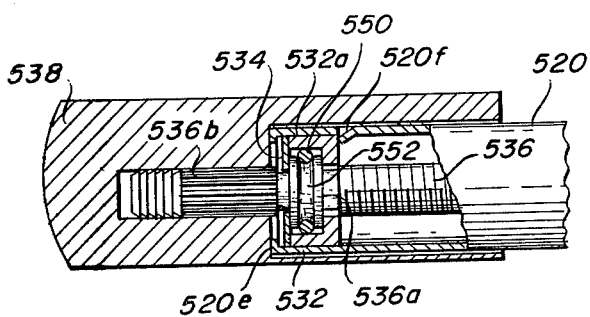
Fig. 10
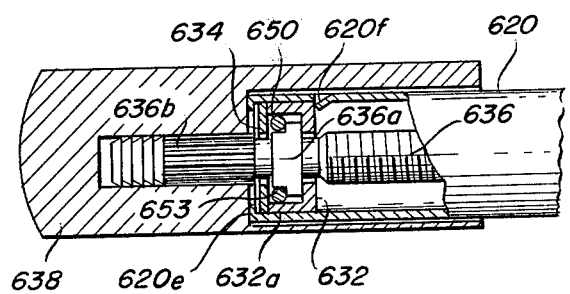

CABLE TENSION ADJUSTING MEANS FOR A BRAKE CABLE OPERATING LEVER

BRIEF DESCRIPTION OF THE PRIOR ART

Brake cable operating lever systems are well known in the prior art, as evidenced by the patents to Orscheln U.S. Pat. Nos. 2,171,403, 2,464,096, and 2,464,097, Hirst U.S. Pat. No. 3,379,074 and the Lipshield application Ser. No. 806,963 filed June 16, 1977, now Pat. No. 4,127,042, each assigned to the same assignee as the present invention. These prior cable operating systems are of the type including a bifurcated lever handle pivotally connected with a pair of mounting plates for mounting the lever assembly on the vehicle, and a pull link pivotally connected at one end to a brake linkage, such as a co-axial cable, by means of a pin that extends transversely through a pair of slots contained in the mounting plates, the pull link and a fitting on the brake linkage. The pull link is pivotally connected at the other end with an adjusting tube and yoke assembly which is threadably connected with one end of the adjusting screw. The adjusting screw extends through the tubular housing portion of the bifurcated lever handle and abuts its external shoulder against the internal shoulder at the end of the lever handle assembly and is secured in position by the adjusting knob. The brake load is supported by the adjusting knob against the end of the handle assembly, whereby if the adjusting knob should be removed, the brake operating means is rendered inoperative.

While the known brake operating means has performed quite satisfactorily in spite of the above mentioned handicap, it consists of several parts that are expensive to produce and assemble. The present invention was developed to provide a safer brake cable operating lever which avoids the above and other drawbacks of the devices of the prior art, and which is of simpler, more economical construction requiring fewer parts.

SUMMARY OF THE INVENTION

Accordingly, a primary object of the present invention is to provide an improved brake cable operating lever, wherein the rotary tension-adjusting screw member which extends axially of the operating lever means includes intermediate its ends an annular external collar portion by means of which the screw member is supported—by an abutment shoulder within the lever—against axial displacement toward the pivot axis of the lever. Accordingly, the brake cable operating means remains operable even if the manual knob member were to be removed from the screw member.

A more specific object of the invention is to provide internal friction means for restricting the screw member against undesired rotation relative to the operating lever. In one form, the internal friction means comprises a spring washer arranged concentrically about the screw member between the annular collar portion and a flat washer, and in another form, an O-ring is substituted for the spring washer. In a further embodiment, the annular collar portion on the screw member is supported in a binding-free manner by at least one cup-shaped washer member the flange portion of which extends concentrically at least partially about the collar portion of the screw member. The desired frictional resistance may be obtained by a spring washer or a resilient O-ring compressed between the collar portion and the cup-shaped washer. In another modification, an O-ring may be mounted in an annular groove or channel defined in the outer circumference of the screw member collar portion, which O-ring is radially compressed inwardly by, and is in frictional engagement with, the inner circumferential surface of the flange portion of the cup-shaped washer, according to a further embodiment, a pair of opposed cup-shaped washer members are arranged concentrically about the collar portion, the ends of the flanges being in abutting engagement. In this embodiment, the internal friction resisting rotation of the screw member is afforded by an O-ring that is mounted concentrically about the screw member between the operating knob and the adjacent extremity of the tubular end portion of the operating lever.

BRIEF DESCRIPTION OF THE DRAWING

Other objects and advantages of the invention will become apparent from a study of the following specification when viewed in the light of the accompanying drawing, in which:

FIG. 1 is a partly sectioned elevational view of a first embodiment of the brake cable operating means of the present invention with the operating lever in the "brake-on" position;

FIG. 2 is a sectional view taken along line 1—1 of FIG. 1;

FIGS. 6–10 are detailed sectional views of modifications of the apparatus of FIGS. 1–3 including various types of internal friction means for resisting rotation of the screw member about its axis.

DETAILED DESCRIPTION

Figure 3:
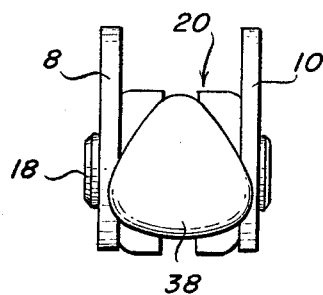
FIG. 3 is a right hand end view of the apparatus of FIG. 1.

Referring first more particularly to the embodiment of FIGS. 1–3, the brake cable operating means 2 of the present invention—which is adapted to operate the conventional parking brake cable 4 of a motor vehicle—includes mounting plate means 6 that are adapted to be secured to the vehicle chassis frame (not shown). More particularly, the mounting plate means 6 includes a pair of parallel spaced mounting plates 8 and 10 containing opposed slots 12 for slidably receiving a transversely extending pivot pin 14. The pivot pin 14, which is guided by the horizontally-extending guide slots 12, is pivotally connected to one end of a yoke member 16 the other end of which is connected with the parking brake cable 4, as is known in the art. Pivotally connected at one end by the pivot pin 18 with the mounting plate means 6 are operating lever means 20. As shown in FIG. 2, the operating lever means includes bifurcated leg portions 20a, 20b that are arranged on opposite sides of a cylindrical spacer member 22 that is mounted on the pivot shaft 18. The operating lever means 20 is pivotally displaceable from the "brake-on" position of FIG. 1 to the "brake-off" position of FIG. 4.

Mounted for sliding displacement axially within the hollow central portion of the operating lever means 20 is an adjustable pivot means 26 which, as shown in FIG. 2, has a U-shaped cross-section. A generally U-shaped connecting link 28 is provided that is pivotally connected at one end with the pivot shaft 14 of the cable connecting means 16, the other end of the connecting link extending through a slot in the bottom of the operating lever 20 for pivotal connection with the adjustable pivot means 26 by pivot pin 30. A rigid tubular member 32 is secured, for example by welding, at one end with the adjustable pivot means 26, the tubular member 32 extending axially within the operating lever means 20.

At its right hand end, the operating lever means 20 includes a rigidly secured tubular portion 20d that terminates at its right hand extremity in a radially inwardly directed end portion 20e. Adjacent the right hand end of the tubular portion 20d, radially inwardly directed lances or deformations 20f are provided that define abutment shoulder means against which is supported a first washer member 34. Extending axially through the tubular portion 20d is a screw member 36 that is provided intermediate its ends with an annular collar portion 36a that is in abutting engagement with the washer 34. At its left hand end, the screw member 36 is threadably connected with the right hand end of the tubular connecting means 32, and at its right hand end, the screw member includes a knurled portion non-rotatably connected with a knob 38. Arranged concentrically about the right hand end of the screw member 36 between the collar portion 36a and the inwardly extending end portion 20e are a spring washer 40 and a second annular washer 42. Owing to its compressed condition between the collar portion 36a and the second washer 42, the spring washer 40 applied internal friction to the screw member 36 to resist rotation thereof relative to the operating lever means 20.

OPERATION

Figure 4:
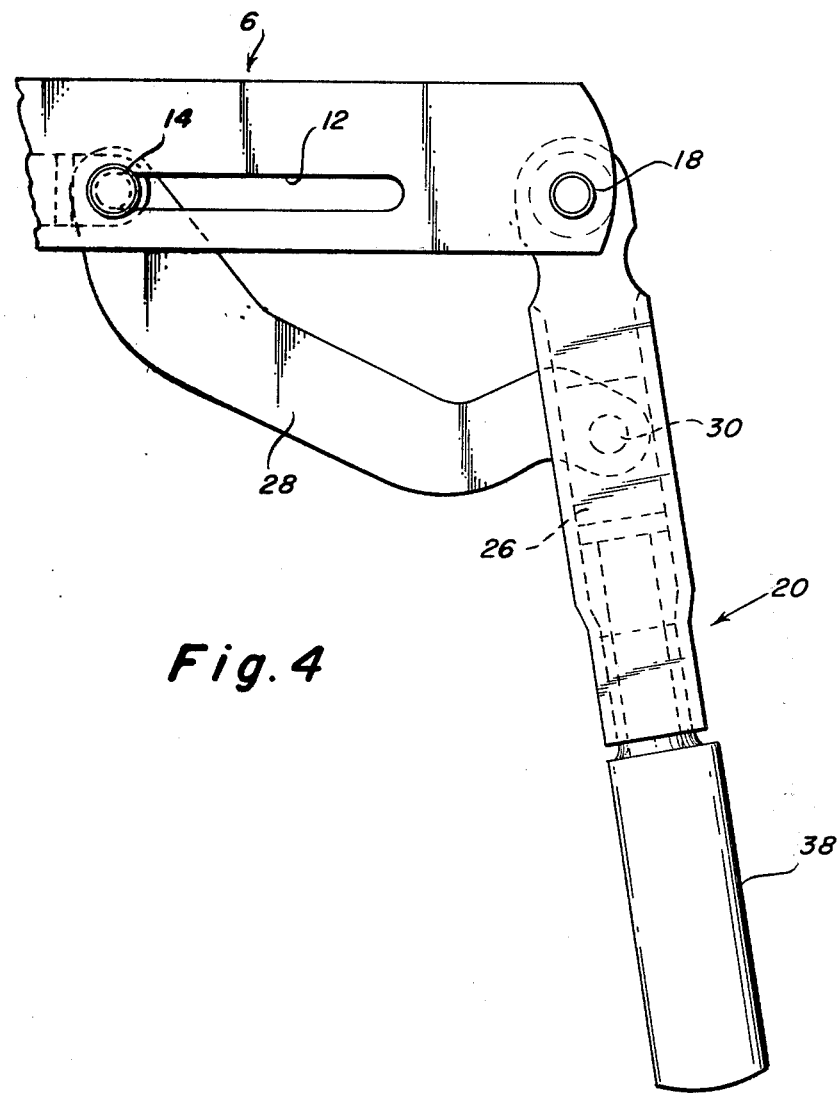
FIG. 4 is an elevational view of the apparatus of FIG. 1 in the "brake-off" position.

In operation, when the operating lever means 20 is in the "brake-off" position of FIG. 4, the distance between the adjustable pivot means 26 and the pivot shaft 18 between the operating lever 20 and the mounting plate means 6 may be adjusted, thereby to vary the tension applied to the parking brake cable 4 when the operating lever 20 is pivoted upwardly toward the "brake-on" position of FIG. 1.

It is important to note that owing to the cooperation between the abutment shoulder means 20f and the collar portion 36a of the screw member 36, the brake cable operating means of the present invention will remain operable even if the knob member 38 were to be removed from the right hand end of the screw member 36. Thus, a further safety measure is provided for maintaining the parking brake cable in a tension condition even if the knob member 38 were to be removed from the screw member 36.

Figure 5:
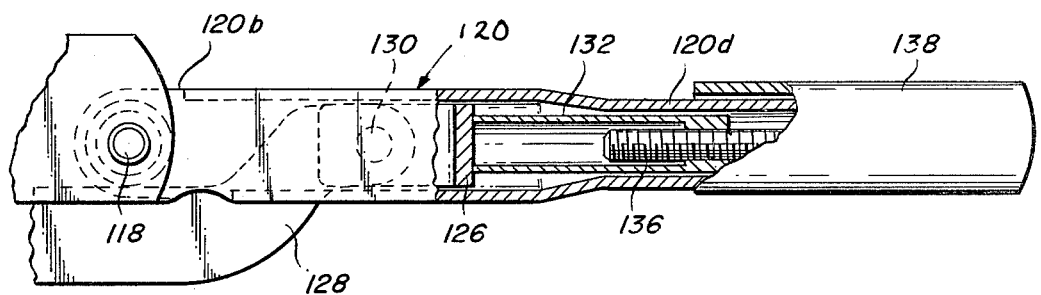
FIG. 5 is a partly sectioned elevational view of a modification of the apparatus of FIG. 1.

Referring now to the modification of FIG. 5, the tubular portion 120d at the right hand end of the operating lever means 120 is formed integrally with the remaining portion of the lever means, instead of a welded separate portion 20d as in the embodiment of FIGS. 1-3.

Figure 6:
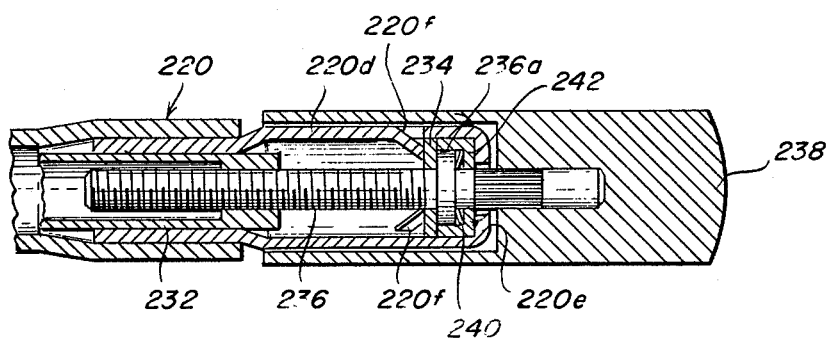

Referring now to the modification of FIG. 6, the second washer 242 that is mounted concentrically about the screw member 236 has a generally cup-shaped configuration and includes an annular flange portion that extends concentrically about the collar portion 236a in abutting engagement with the first washer 234. Compressed between the collar portion 236a and the second washer 242 is a spring washer 240 that applies internal friction to the screw member 236 to restrict rotation thereof relative to the operating lever means 220.

Referring now to the modification of FIG. 7, the internal friction restricting rotation of the screw member 336 is afforded by an O-ring 341 that is compressed between the cup-shaped second washer 342 and the collar portion 336a of the screw member 336.

In the embodiment of FIG. 8, the first and second washers 434 and 442 each have a cup-shaped configuration, the flanges of the washers extending partially concentrically about the collar portion 436a and terminating in abutting engagement. Consequently, the collar portion 436a of the screw member 436 is protected against binding. In order to provide internal resistance for restricting rotation of the screw member 436, an O-ring 450 that is arranged concentrically about the screw member 436 is compressed between the inwardly directed end portion 420e of the operating lever means 420 and the adjacent wall surface of the bore contained within the knob member 438.

Referring now to the embodiment of FIG. 9, the resilient O-ring 550 is mounted in an annular groove 552 contained in the outer circumference of the collar portion 536a of the screw member 536. The annular flange portion 532a of the cup-shaped washer 532 (mounted concentrically on the screw member 536 and supported by the abutment 520f) extends concentrically about the collar portion 536a in compressing frictional engagement with the O-ring 550. The flat washer 534 is supported between the end of the flange portion 532a of the cup-shaped washer and the radially inwardly bent end portion 520e of the tubular member 520. The operating knob 538 is non-rotatably mounted upon the knurled extremity 536b of the screw member 536. It is apparent that the cooperation between the O-ring 550 and the inner surface of the cup-shaped washer 532 affords the desired internal resistance for restricting rotation of the screw member 536. It is important to note that the cooperation between the cup-shaped washer 532 and the flat washer 534 prevents binding of the tension adjusting means.

In the modification of FIG. 10, the O-ring 650 is arranged concentrically within an annular channel or relieved portion 653 formed in the end of the collar portion 636a adjacent the knurled end surface 636b of the screw member 636. As in the embodiment of FIG. 9, the desired frictional internal resistance for restricting rotation of the screw member 636 is achieved by the compressional cooperation between resilient O-ring 650 and the flange portion 632a of the cup-shaped washer member 632. Binding of the tension adjustment means is prevented by the cooperation between the flat washer 634 and the flange portion of the cup-shaped washer 632.

It will be seen that in all of the embodiments of the invention, the abutment shoulder means provided on the operating lever, together with the first washer element supported thereby, support the annular collar portion on the screw member even in the event that the knob member were to be removed from the screw member, thereby affording a significant safety improvement in the art.

While, in accordance with the Patent Statutes, the preferred form and embodiments of the invention have been illustrated and described, it will be apparent to those skilled in the art that various changes may be made without deviating from the inventive concepts set forth above.

What is claimed is:

1. Brake operating apparatus for applying tension to a parking brake cable for motor vehicles or the like, comprising
- (a) stationary mounting plate means (6) adapted for connection with a frame of the vehicle;
- (b) cable connecting means (16) connected for sliding movement axially of said mounting plate means, said cable connecting means being adapted for connection with one end of the parking brake cable;
- (c) operating lever means (20) pivotally connected at one end with said mounting plate means for pivotal displacement between brake-on and brake-off positions, respectively, said operating lever means including at its other end a longitudinally extending tubular portion (20d);
- (d) a connecting link (28) pivotally connected at one end with said cable connecting means;
- (e) adjustable pivot means (30) pivotally connecting the other end of said connecting link with said operating lever means, said adjustable pivot means being mounted adjacent the pivot axis of said lever means for displacement axially of said lever means; and
- (d) cable tension adjusting means for displacing said adjustable pivot means aially of said operating lever means, whereby the brake cable tension, when the brake cable is in the brake-on position, is a function of the distance between said adjustable pivot means and the pivotal connection between said operating lever and said mounting plate means, said adjusting means including
  - (1) a rotary screw member (36) extending axially within the tubular portion of said operating lever means, said screw member including intermediate its ends an annular collar portion (36a) the outer diameter of which corresponds generally with the inner diameter of said operating lever tubular portion;
  - (2) means defining an abutment shoulder (20f) within said tubular portion of said operating lever means for rotatably supporting said collar portion and said screw member against axial displacement in the direction of the pivot axis of said lever means;
  - (3) connecting means threadably connecting said adjustable pivot means with one end of said screw member;
  - (4) knob means (38) containing at one end a bore, said knob means being rotatably mounted on said operating lever with the tubular portion thereof rotatably extending within said bore, said knob means being non-rotatably connected with the other end of said screw member for rotating the same to displace said adjustable pivot means axially of said operating lever means, whereby the brake cable operating means remains functional even upon removal of the knob means from said screw member; and
  - (5) internal friction means for restricting rotation of said screw member relative to said operating lever means.

2. Apparatus as defined in claim 1, wherein said internal friction means includes a spring washer arranged concentrically about said screw member.

3. Apparatus as defined in claim 1, wherein said internal friction means includes a resilient compressed O-ring arranged concentrically about said screw member.

4. Apparatus as defined in claim 1, and further including a first washer member arranged concentrically about said screw member intermediate said abutment shoulder and said screw member collar portion.

5. Apparatus for tensioning a parking brake cable for motor vehicles or the like, comprising
- (a) stationary mounting plate means adapted for connection with a frame of the vehicle;
- (b) cable connecting means connected for sliding movement axially of said mounting plate means, said cable connecting means being adapted for connection with one end of the parking brake cable;
- (c) operating lever means pivotally connected at one end with said mounting plate means for pivotal displacement between brake-on and brake-off positions, respectively, said operating lever means including at its other end a longitudinally extending tubular portion the free end of which terminates in a radially inwardly directed wall portion;
- (d) a connecting link pivotally connected at one end with said cable connecting means;
- (e) adjustable pivot means pivotally connecting the other end of said connecting link with said operating lever means, said adjustable pivot means being mounted adjacent the pivot axis of said lever means for displacement axially of said lever means; and
- (d) cable tension adjusting means for displacing said adjustable pivot means axially of said operating lever means, whereby the brake cable tension, when the brake cable is in the brake-on position, is a function of the distance between said adjustable pivot means and the pivotal connection between said operating lever and said mounting plate means, said adjusting means including
  - (1) a rotary screw member arranged within said tubular portion of, and extending axially of said operating lever means, said screw member including intermediate its ends an annular collar portion;
  - (2) means defining an abutment shoulder on said tubular portion for rotatably supporting said collar portion and said screw member against axial displacement in the direction of the pivot axis of said lever means;
  - (3) first and second washer means arranged concentrically on said screw member, said first washer means being between said screw collar portion and said abutment shoulder means and said second washer means being between said radially inwardly directed wall portion and said screw collar portion;
  - (4) connecting means threadedly connecting said adjustable pivot means with one end of said screw member;
  - (5) knob means containing at one end a bore, said knob means being rotatably mounted on said operating lever with the tubular portion thereof rotatably extending within said bore, said knob means being non-rotatably connected with the other end of said screw member for rotating the same to displace said adjustable pivot means axially of said operating lever means, and
  - (6) internal friction means for restricting rotation of said screw member relative to said operating lever means, whereby the brake cable operating means remains functional even upon removal of the knob means from said screw member.

6. Apparatus as defined in claim 5, wherein said internal friction means comprises a spring washer mounted concentrically about said screw member in axially compressed relation intermediate said screw member collar portion and one of said washers.

7. Apparatus as defined in claim 5, wherein said internal friction means comprises a resilient O-ring mounted concentrically about said screw member in axially compressed relation intermediate said screw member collar portion and one of said washers.

8. Apparatus as defined in claim 5, wherein at least one of said washers comprises a cup-shaped washer having an annular flange portion that extends concentrically about said collar portion, the end extremity of said annular flange portion being in abutting engagement with the other washer member, thereby to prevent binding of said cable tension adjusting means.

9. Apparatus as defined in claim 8, wherein said internal friction means includes a spring washer mounted concentrically about said screw member in axially compressed relation between said screw member collar portion and one of said washers.

10. Apparatus as defined in claim 8, wherein said internal friction means includes a resilient O-ring mounted concentrically about said screw member in axially compressed relation between said screw member collar portion and one of said washers.

11. Apparatus as defined in claim 8, wherein said internal friction means includes a resilient O-ring arranged concentrically about said screw member collar portion in radially inwardly compressed relation between said collar portion and the inner circumferential surface of the flange portion of said cup-shaped washer.

12. Apparatus as defined in claim 11, wherein said O-ring is mounted within an annular groove contained in the outer circumference of said collar portion.

13. Apparatus as defined in claim 11, wherein said O-ring is mounted within an annular relieved surface defined within one end of said collar portion.

* * * * *